B. H. SHEARER.
Vehicle-Pole.
No. 210,568.   Patented Dec. 3, 1878.
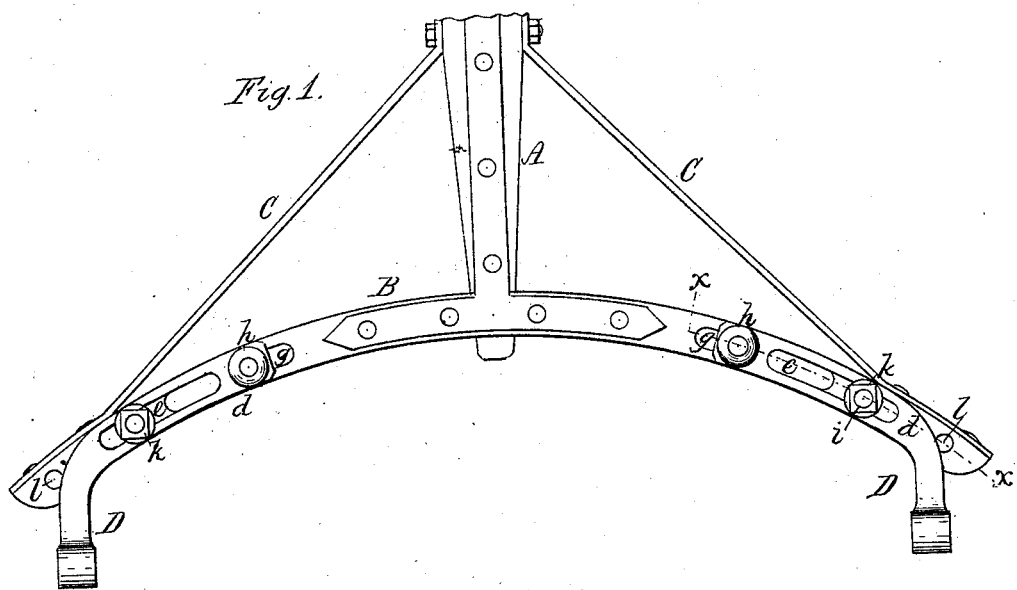
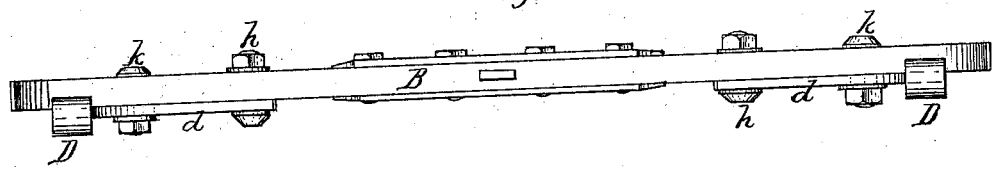
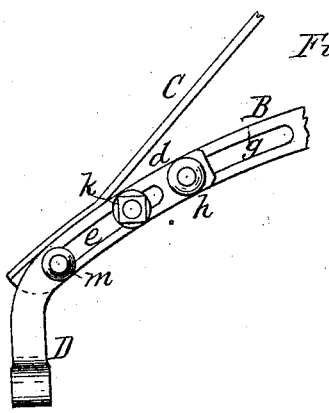
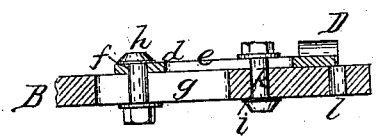

UNITED STATES PATENT OFFICE.

BENSON H. SHEARER, OF RUSHFORD, NEW YORK.

IMPROVEMENT IN VEHICLE-POLES.

Specification forming part of Letters Patent No. 210,568, dated December 3, 1878; application filed October 4, 1878.

*To all whom it may concern:*

Be it known that I, BENSON H. SHEARER, of Rushford, in the county of Allegany, in the State of New York, have invented new and useful Improvements in Vehicle-Poles, of which the following is a specification, reference being had to the accompanying drawing.

This invention relates to that class of vehicle-poles which are provided with adjustable eye-pieces, so as to permit the distance between the eye-pieces to be regulated to correspond with the distance between the draw-clips of the vehicle, whereby one pole is enabled to be used for a number of different vehicles.

My invention consists of the particular construction of the device, whereby the range of adjustment is rendered very large, and the connection between the eye-pieces and the pole made very secure, as will be hereinafter fully set forth.

In the accompanying drawing, Figure 1 is a bottom-plan view of the rear portion of a vehicle-pole provided with my improvement. Fig. 2 is a rear elevation thereof. Fig. 3 is a fragmentary bottom-plan view, showing one of the adjustable eye-pieces in its extreme outer position. Fig. 4 is a vertical section in line $x\ x$, Fig. 1.

Like letters of reference designate like parts in each of the figures.

A represents the pole; B, the curved cross-piece arranged at the rear end thereof, and C C the braces connecting the pole with the cross-piece. D D are the adjustable eye-pieces, each constructed with an elongated flat plate or leaf, $d$, which is curved to correspond with the curvature of the cross-piece B. Each leaf $d$ is provided with a longitudinal slot, $e$, and a bolt-hole, $f$, arranged between the end of the slot $e$ and the end of the leaf.

$g\ g$ are two slots or elongated openings arranged in the cross-piece B, and corresponding in size with the slots $e$, formed in the leaves $d$. The slots $g$ are arranged at such a distance from the ends of the cross-piece that when the eye-pieces D are arranged in their outermost position the bolts $h$, passing through the bolt-holes $f$ of the leaves $d$, will bear against or be close to the outer ends of the slots $g$.

$i$ is a bolt-hole arranged in the cross-piece B, near the outer end of each slot $g$, and $k$ is a bolt passing through the hole $i$ and the slot $e$ of the leaf of the eye-piece.

The bolts $k$ are stationary with reference to the cross-piece B, and the bolts $h$ are stationary with reference to the leaves $d$, so that the bolts $h$ and $k$ approach each other in adjusting the eye-piece outward, and recede from each other when the eye-piece is moved in the opposite direction, the bolt $h$ sliding in the slot $g$ of the cross-piece B, and the bolt $k$ in the slot $e$ of the leaf $d$. Upon loosening the nuts of the bolts $h\ k$ the eye-piece is readily adjusted to the desired position, where, by tightening the nuts again, the eye-piece is firmly secured in place.

A bolt-hole, $l$, is preferably arranged near each end of the cross-piece B, in such manner that when the eye-piece is in its extreme outer position a bolt, $m$, can be passed through the hole $l$ and the slot $e$ of the leaf, to serve as an additional fastening, as the two bolts $h\ k$ are in close proximity in this position of the eye-piece. In all other positions of the eye-piece the extra bolt $m$ is dispensed with.

The peculiar arrangement of the slots $e\ g$ and bolts $h\ k$ enables a comparatively short leaf to be used without rendering the distance between the bolts so small as to render them unable to securely hold the eye-piece in place.

As the braces C relieve the cross-piece B of strains, the slots $g$ do not materially reduce the strength of the cross-piece and pole.

I claim as my invention—

The combination, with the pole A, of the cross-piece B, provided with slots $g$ and bolt-holes $i$, the adjustable eye-pieces D D, provided with leaves $d$, having slots $e$ and bolt-holes $f$, fastening-bolts $h$, made stationary in the leaves $d$, and bolts $k$, made stationary in the cross-piece B, substantially as and for the purpose set forth.

BENSON H. SHEARER.

Witnesses:
RALPH B. LANING,
ADELBERT SHEARER.